United States Patent [19]
Yoshida

[11] Patent Number: 5,660,951
[45] Date of Patent: Aug. 26, 1997

[54] ORGANIC ELECTROLYTE SECONDARY CELL

[75] Inventor: Hiroaki Yoshida, Kyoto, Japan

[73] Assignee: Japan Storage Battery Co., Ltd., Kyoto, Japan

[21] Appl. No.: 558,770

[22] Filed: Nov. 15, 1995

[30] Foreign Application Priority Data

Nov. 15, 1994 [JP] Japan ................................. 6-306831

[51] Int. Cl.⁶ .................................................. H01M 4/58
[52] U.S. Cl. ............................ 429/218; 429/194; 429/212
[58] Field of Search ............................ 429/218, 194, 429/192, 212

[56] References Cited

U.S. PATENT DOCUMENTS

| | | | |
|---|---|---|---|
| 5,310,553 | 5/1994 | Simon et al. | 429/212 |
| 5,344,726 | 9/1994 | Tanaka et al. | 429/209 |
| 5,422,203 | 6/1995 | Guyomard et al. | 429/194 |
| 5,426,006 | 6/1995 | Delnick et al. | 429/218 |
| 5,432,029 | 7/1995 | Mitate et al. | 429/194 |
| 5,498,493 | 3/1996 | Dahn et al. | 429/218 |
| 5,512,392 | 4/1996 | Fauteux et al. | 429/218 |
| 5,529,859 | 6/1996 | Shu et al. | 429/194 |
| 5,543,021 | 8/1996 | Yazami et al. | 204/294 |

*Primary Examiner*—Stephen Kalafut
*Assistant Examiner*—Jonathan S. Krueger
*Attorney, Agent, or Firm*—Sughrue, Mion, Zinn, Macpeak & Seas

[57] ABSTRACT

In the present invention, an organic electrolyte secondary cell of the present invention is comprised of a positive electrode, a negative electrode including a carbon material occluding and discharging lithium ion, and an organic electrolyte. In the cell, at least a part of the carbon material is covered with a lithium alkoxide compound having a molecular weight more than 52.

10 Claims, 1 Drawing Sheet

FIGURE
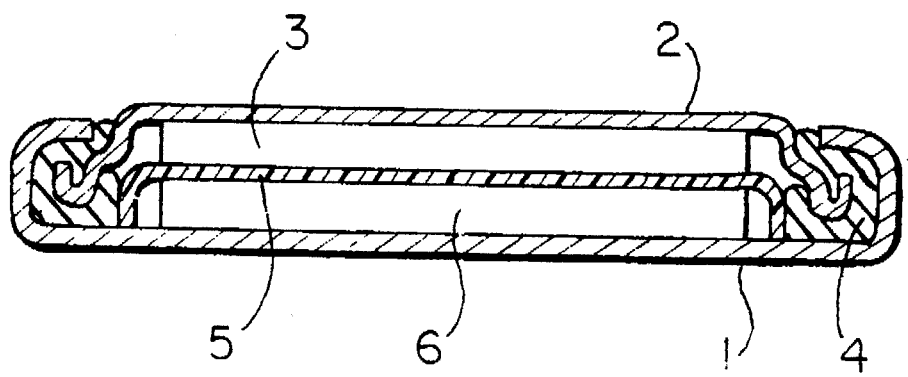

ORGANIC ELECTROLYTE SECONDARY CELL

BACKGROUND OF THE INVENTION

1. Field of the Invention

The present invention relates to an organic electrolyte secondary cell which has a high energy density and reliability as a power source for an electronic equipment, for maintaining a memory, for a electric vehicle, for storing electric power and the like.

2. Description of the Related Art

Accompanying with the drastic miniaturization and lightening of electronic equipments, it is highly required to develop a secondary cell as a power source thereof which is miniaturized and lightened as well as has a high energy density, further is capable of charging and discharging repeatedly. In addition, due to environment problems such as air pollution and increase of carbon dioxide, it is desired to utilize an electric automobile in earliest stages. Accordingly, it is desired to develop an excellent secondary cell having features such as high efficiency, high power, high energy density and light in weight. Since secondary cell using an organic electrolyte which satisfies such requirements has an energy density several times as high as that of a conventional cell using an aqueous electrolyte, it is desired to put it to practical use.

As a positive active material of the organic electrolyte secondary cell, various types of material have been examined, such as titanium disulfide, lithium-cobalt composite oxide, spinel type lithium-manganese oxide, vanadium pentoxide and molybdenum trioxide. In these materials, lithium-cobalt composite oxide ($LiCoO_2$) and spinel type lithium-manganese oxide ($LiMn_2O_4$) conduct charging/discharging in extremely high potential more than 4 V ($Li/Li^+$). Consequently, they are used as a positive electrode so as to utilize a cell having a high discharge voltage.

As a negative active material of the organic electrolyte secondary cell, lithium, Li-Al alloy and carbon material capable of occluding and discharging lithium ion, and the like have been examined. In these materials, carbon material has an advantage that a cell having a long cycle life can be obtained.

However, in this kind of cell, since lithium having lower potential is used as the negative active material and metal oxide having higher potential is used as the positive material, electrolyte is easy to be decomposed. Accordingly, it is necessary to consider about this point to select the electrolyte, and various kinds of electrolytes have been proposed to use. Almost all of the electrolytes are the mixture of a high dielectric constant solvent such as propylene carbonate, ethylene carbonate, γ-butyrolactone, sulforane, and a low viscosity solvent such as 1,2-dimethoxyethane, dimethylcarbonate, ethylmethylcarbonate, diethylecarbonate.

On the other hand, as a solute, lithium perchlorate, lithium trifluoromethanesulfonate, lithium hexafluorophosphate and the like are generally used. Particularly, lithium hexafluorophosphate is popularly used in recent, because of high safety and high ion conductive rate of electrolyte in which it is dissolved.

However, when carbon material is used as the negative electrode, a reduction decomposition reaction of the electrolyte occurs on the surface of the negative electrode with generating gas in the first charging. Accordingly, a cell case may be swelled, or a cell capacity may be reduced.

The charge is forwarded to stop generating gas, so that a charge reaction to carbon begin to forward. That is, a electrolytic polymerization reaction occurs on the surface of the carbon material in the initial stage of charge, and a polymer coat is formed on the surface of the carbon material. When the coat is formed to some degree, the electrolytic polymerization reaction is supressed because of lack of the electron conductivity of the coat, thereby forwarding only charging reaction of lithium ion. However, since lithium ion is consumed for the polymerization reaction in the initial stage, and is not effectively used for charging reaction, the capacity of the cell is reduced.

SUMMARY OF THE INVENTION

It is an object of the present invention to provide an organic electrolyte secondary cell in which reduction of a cell capacity caused by decomposition of an electrolyte can be supressed.

An organic electrolyte secondary cell of the present invention is comprised of a positive electrode, a negative electrode including a carbon material occluding and discharging lithium ion, and an organic electrolyte, wherein at least a part of the carbon material is covered with a lithium alkoxide compound having a molecular weight more than 52.

The organic electrolyte secondary cell according to the present invention can suppresses the reduction of a cell capacity caused by decomposition of the electrolyte.

BRIEF DESCRIPTION OF THE DRAWING

In the accompanying drawing, a FIGURE is a sectional view showing a structure of a button-type cell which is an example of an organic electrolyte secondary battery.

DETAILED DESCRIPTION OF THE INVENTION

The detailed description of the invention will be described as follows referring to the accompanying drawing. Although the present invention will be described along preferable examples, the present invention is not limited by these examples.

Lithium-cobalt oxide ($LiCoO_2$), graphite powder as a conductive material, and fluorine polymer powder as a binder were sufficiently mixed in a weight ration of 90:3:7, thereafter the mixture was pressurized and molded to thereby produce a positive electrode. Carbon powder and fluorine polymer powder as a binder were mixed in a weight ration of 91:9, thereafter the mixture was pressurized and molded to thereby produce a negative electrode. The negative electrode was impregnated with 1,2-ethanediol solution of dilithium-1,2-ethanediol under reduced pressure, thereafter it was dried to thereby form dilithium-1,2,-ethanediol coat on the surface of the carbon material. Incidentally, in the above processes, the solvent was adjusted so that the weight ratio of lithium alkoxide became about 1% with respect to the carbon material.

FIGURE is a sectional view of a cell. In the drawing, reference numeral 1 designates a case also used as a positive electrode terminal which is produced by stamping a stainless steel (SUS316); 2, a sealing plate also used as a negative electrode terminal which is produced by stamping a stainless steel (SUS316); 3, the negative electrode which is attached to the inner wall of the sealing plate 2; 5, a separator comprising polypropylene to which organic electrolyte is impregnated; and 6, the positive electrode. An opening end portion of the case is inwardly crimped, and the outer periphery of the sealing plate 2 is clamped via a gasket 4, thereby tightly closing and sealing the cell.

A mixture was used as an organic electrolyte in which an organic solvent containing ethylenecarbonate and dimethylecarbonate in a volume ratio of 1:1 was mixed with lithium hexafluorophosphate in a concentration of 1 mol/l. The organic electrolyte of about 150 μl was injected into the cell. The size of the cell was 20 mm in diameter, and 2 mm in height. Thus produced cell was a cell A of the present invention.

Cell B, C and D of the present invention were produced as similar to the above example except using dilithium-1,3-propanediol, trilithium-glyceline, and trilithium-1,2,6-hexanetriol instead of dilithium-1,2-ethanediol, respectively, and using 1,3-propanediol, glyceline, and 1,2,6-hexanetriol instead of 1,2-ethanediol, respectively.

For comparison, a cell E was produced as similar to the cell of the present invention except that the carbon material was not impregnated with alcohol solution of lithiumalkoxide. Further, a cell F and G for comparison were produced as similar to the cell of the present invention except using methoxylithium and ethoxylithium instead of dilithium-1,2-ethandiol, respectively, and using methanol and ethanol instead of 1,2-ethandiol, respectively.

Next, in a thermostat at 25° C., these cells were charged by a constant current of 2.0 mA until a terminal voltage became 4.2 V. Successively, these cells were discharged by the constant current 2.0 mA until the terminal voltage became 3 V. The discharge capacities of respective cells are indicated in Table 1.

TABLE 1

| CELL | MOLECULAR WEIGHT OF COMPOUND | DISCHARGE CAPACITY (mAh) |
|------|------------------------------|--------------------------|
| E    | —                            | 20.5                     |
| F    | 38                           | 20.3                     |
| G    | 52                           | 20.4                     |
| A    | 74                           | 21.8                     |
| B    | 88                           | 21.3                     |
| C    | 110                          | 23.9                     |
| D    | 152                          | 23.7                     |

As apparent from Table 1, the discharge capacities of the cells A, B, C and D of the present invention, which the surface of the carbon material is covered with compound having a molecular weight more than 52, is larger than that of the comparative cells E, F and G. It may be considered that the surface of the carbon material is covered with compound having a molecular weight more than 52, so that the decomposition reaction of the electrolyte is supressed.

In the above examples, although the Weight ratio of lithium alkoxyde was about 1% with respect to the carbon material, it is not limited thereto. The weight ratio lithium alkoxyde is preferably in the range of 0.1 to 10 weight %, and more preferably, in the range of 0.5 to 5 weight %. If it is less than 0.5 weight %, its effect reduces accompanying with reducing adding amount thereof. If it is more than 5 weight %, the internal resistance of the cell increases accompanying with increasing adding amount thereof.

In the above examples, although lithium-cobalt oxide was used as the positive electrode, various types of material such as lithium-nickel composite oxide ($LiNiO_2$), titanium disulfide, manganese dioxide, spinel type lithium-manganese oxide, vanadium pentoxide, molybdenum trioxide can be used. Also, in the examples, although graphite was used as the negative material, the similar effect can be obtained by using a low crystalline carbon material.

The organic solvent and solute are not limited to the above examples. The same effect can obtained by using the similar one used in the conventional lithium cell. For example, as the organic solvent, the mixture of a high dielectric constant solvent such as propylene carbonate, ethylene carbonate, γ-butyrolactone, sulforane, and a low viscosity solvent such as 1,2-dimethoxyethane, dimethylcarbonate, ethylmethylcarbonate, diethylecarbonate can be used. Further, as the electrolyte solute, at least one of lithium perchlorate, lithium hexafluoroarsenate, lithium tetrafluoroborate, lithium hexafluorophosphate and the like can be used.

Incidentally, although the cells according to the above examples are coin-shaped cells, the present invention can apply to a cylindrical, rectangular, paper-shaped cell or the like.

What is claimed is:

1. An organic electrolyte secondary cell comprising a positive electrode, a negative electrode including a carbon material occluding and discharging lithium ion, and an organic electrolyte, wherein at least a part of said carbon material is covered with a lithium alkoxide compound having a molecular weight more than 52.

2. The organic electrolyte secondary cell according to claim 1, wherein said lithium alkoxide is a dilithium salt of diols.

3. The organic electrolyte secondary cell according to claim 1, wherein said lithium alkoxide is a trilithium salt of triols.

4. The organic electrolyte secondary cell according to claim 1, wherein a weight ratio of said lithium alkoxide compound with respect to said carbon material lies in a range from 0.1 to 10 weight %.

5. The organic electrolyte secondary cell according to claim 4, wherein a weight ratio of said lithium alkoxide compound with respect to said carbon material lies in a range from 0.5 to 5 weight %.

6. An organic electrolyte secondary cell comprising a positive electrode, a negative electrode including a carbon material occluding and discharging lithium ion, and an organic electrolyte, wherein at least a part of said carbon material is covered with a lithium alkoxide compound having a molecular weight equal to or more than 74.

7. The organic electrolyte secondary cell according to claim 6, wherein said lithium alkoxide is a dilithium salt of diols.

8. The organic electrolyte secondary cell according to claim 6, wherein said lithium alkoxide is a trilithium salt of triols.

9. The organic electrolyte secondary cell according to claim 6, wherein a weight ratio of said lithium alkoxide compound with respect to said carbon material lies in a range from 0.1 to 10 weight %.

10. The organic electrolyte secondary cell according to claim 6, wherein a weight ratio of said lithium alkoxide compound with respect to said carbon material lies in a range from 0.5 to 5 weight %.

* * * * *